United States Patent
Neimann

(10) Patent No.: US 7,119,135 B2
(45) Date of Patent: Oct. 10, 2006

(54) SEED OIL BASED COATINGS AND THEIR APPLICATIONS

(75) Inventor: Lance Neimann, Burr Ridge, IL (US)

(73) Assignee: Green Products LLC, Romeoville, IL (US)

( * ) Notice: Subject to any disclaimer, the term of this patent is extended or adjusted under 35 U.S.C. 154(b) by 255 days.

(21) Appl. No.: 10/753,238

(22) Filed: Jan. 6, 2004

(65) Prior Publication Data

US 2005/0148714 A1    Jul. 7, 2005

(51) Int. Cl.
*C08G 79/02* (2006.01)

(52) U.S. Cl. .................. 524/34; 524/313; 524/318; 524/432

(58) Field of Classification Search ........... 524/34, 524/313, 318, 432
See application file for complete search history.

(56) References Cited

U.S. PATENT DOCUMENTS

| | | | |
|---|---|---|---|
| 2,476,178 A | 7/1949 | Cahill | |
| 2,572,252 A | 10/1951 | Erasmus | |
| 2,680,725 A | 6/1954 | Di Battista | |
| 2,773,780 A | 12/1956 | Koenecke | |
| 2,885,297 A | 5/1959 | Reisinger | |
| 2,889,236 A | 6/1959 | Hahn | |
| 2,956,897 A | 10/1960 | Rushton | |
| 3,096,196 A | 7/1963 | Bettoli | |
| 3,120,499 A | 2/1964 | Broadhead | |
| 3,269,967 A | 8/1966 | Broadhead | |
| 3,328,186 A | 6/1967 | Louton | |
| 3,555,763 A | 1/1971 | Bloxom | |
| 4,193,898 A | 3/1980 | Miller | |
| 4,600,441 A | 7/1986 | Goldberg et al. | |
| 4,997,480 A | 3/1991 | Rao | |
| 5,269,839 A | 12/1993 | Sodhi | |
| 5,959,067 A * | 9/1999 | Bakker et al. | ........... 528/295.3 |
| 6,265,133 B1 * | 7/2001 | Takahashi et al. | ........ 430/281.1 |
| 6,281,189 B1 * | 8/2001 | Heimann et al. | ........... 510/491 |
| 6,495,074 B1 | 12/2002 | Carr | |
| 6,536,177 B1 | 3/2003 | Italiane et al. | |
| 6,596,519 B1 | 7/2003 | Takayanagi et al. | |
| 6,627,700 B1 * | 9/2003 | Kadambande et al. | ....... 525/7.3 |
| 6,749,677 B1 | 6/2004 | Freisthler | |
| 6,835,327 B1 | 12/2004 | Behling | |
| 6,881,776 B1 * | 4/2005 | Butuc | .......... 524/284 |
| 2002/0026884 A1 | 3/2002 | Raad | |

FOREIGN PATENT DOCUMENTS

JP        8176502        7/1996

* cited by examiner

*Primary Examiner*—Peter D. Mulcahy
(74) *Attorney, Agent, or Firm*—Vedder Price Kaufman & Kammholz

(57) ABSTRACT

A coating containing seed oil comprising the following: a seed oil used as a film forming component for the coating with at least one film forming component for the coating; at least one component to provide opacity and solar reflectivity to the coating; at least one component to provide protection to the coating from ultra-violet degradation; at least one filler component to increase the viscosity of the coating; and at least one film component that provides elongation and flexibility to the coating.

2 Claims, No Drawings

SEED OIL BASED COATINGS AND THEIR APPLICATIONS

FIELD OF THE INVENTION

The present invention is directed to the field of seed oils such as soybean oil as a component of coatings for use on roofing, wood, metals, and stucco.

BACKGROUND OF THE INVENTION

Elastomeric (water based/acrylic polymer) coatings currently dominate the roof coating market. Oil based products have been almost completely replaced by water based products due to their volatile organic content (V.O.C.). Seed oils have historically not been deemed suitable for roof coatings because of their need for a carrier solvent that typically composes 40% to 60% of the formulation.

Current California law permits 2.3 pounds per gallon of V.O.C., or a limit of 18% V.O.C. There is not one oil based product in the United States or world that has the so-called EPA "Energy Star" approval. To receive EPA "Energy Star Approval," a roof coating must maintain a reflectance of over "65" after three years of outdoor weathering. The reflectivity requirement is based on the fact that a white (reflective) coating will reflect the heat produced by the sun and dramatically lower the amount of heat developed in a building. Less heat means lower air conditioning costs and a significant reduction in electrical usage which is generated by highly polluting coal fired plants.

The inability to meet the EPA and V.O.C. standards have been major obstacles to the use of previous seed oil based coatings. The use of flammable solvents, poor fire ratings, susceptibility to mold and fungal growth, formation of a skin in the container and the need for heavy metals to cure the coating have been major stumbling blocks.

There have been a number of prior art coatings disclosed in the patent literature. None have effectively used seed oils. U.S. Pat. No. 6,338,878, for example, discloses a high temperature emulsion composition comprising borax and a substantially water-insoluble polymer prepared by aqueous suspension polymerizing a blend of monomers, said blend comprising a plasticizing amount by weight of at least on plasticizing alkyl acrylate monomer, a hardening amount by weight of at least one hardening alkyl acrylate monomer and a crosslinking amount by weight of at least one multi-ethylenically unsaturated monomer, in an aqueous suspension comprising a water-soluble polymer component comprising at least one acrylic polymer having carboxylate functionality, its method of use and coated substrates made therewith. U.S. Pat. No. 6,162,850 is related to this patent.

U.S. Pat. No. 6,569,520 discloses a coating composition for substrates. The coating composition includes a silicate binder and a plurality of photocatalytic particles. The silicate binder functions as a bonding agent to establish the coating on the substrate. A plurality of photocatalyst particles are dispersed throughout the silicate binder. The particles are included in an amount the provides sufficient distribution of the particles in the resulting coating. The incorporation of the present invention onto substrates prevents algal growth on building materials utilizing the coating substrates.

U.S. Pat. No. 6,010,870 discloses a composite material made of a fibrous material and binders in the form of hydroxyfatty acids for the preparation of molded parts in the automobile field, in particular, for acoustic attenuation in the areas of the hood, bulkhead (on both sides), tunnel, door, roof, footwell, pumps, A to D pillars and air distribution duct, and a an optionally self-supporting base for interior trims, especially for instrument panel covers, tunnel linings, door trims, seat back linings, A to D pillar linings and spare wheel covers, and as parts with a double function, especially as roof liner, rear shelf, filling piece, trunk mat or undershield.

U.S. Pat. No. 5,059,459 discloses a method for improving the quality of a mastic coating system by using a latex barrier tiecoat which is composed of water-insoluble latex polymer and a multivalent metal ion. The tiecoat is applied to a substrate and then a mastic coating is applied to the tiecoat to yield a mastic coating system having excellent resistance to blistering when the mastic coating system is exposed to a long-term ponded water.

No prior art patents have disclosed or shown the successful use of organic seeds in roof coatings and the like. By developing a unique method to polymerize/cure seed oils and also through the use of new formulating techniques and additives, a series of coatings have been created that not only resolve the current problems with seed oil based coatings, but also offer significant performance, application and cost advantages over the currently used water based or two component systems.

It is therefore an object of the invention to produce agricultural oil based product that can achieve Energy Star Approval as a roof coating.

It is a further object of the invention to produce a mold resistant interior and exterior coating that passes ASTM 3273 without the use of additives that are poisonous or toxic and do not have a HMIS health rating higher than 1 and produce no off gassing or no smoke when tested under ASTM E 84.

It is another object of the present invention to produce a seed oil based "stucco jacket" as a replacement for "Dryvit" or Stucco that is biobased and highly resistant to water and which can be applied in one coat.

It is still another object of the present invention to provide a metal coating that can prime and preserve metal using one coat and prevent rust bleed through.

It is another object of the present invention to provide a caulk that has over 200% elongation and can be used to bridge cracks of over ½ inch in width.

It is yet a further object of the invention to provide a coating for numerous substrates that will have over 800% elongation for Areas that will have excessive movement.

It is an additional object of the present invention to provide a penetrating stain that preserves wood.

It is an object of the present invention to provide a clear coat that preserves metal, wood, underlying paints and masonry.

It is a further object of the present invention to provide an adhesive used to adhere metal to insulation, wood to wood, metal to metal or various roofing membranes to each other.

These and other advantages of the present invention will become apparent from the detailed description which follows.

SUMMARY OF THE INVENTION

In accordance with the present invention, a novel coating material is shown and disclosed. A coating containing seed oil comprising the following: a seed oil used as a film forming component for the coating; at least one film forming component for the coating; at least one component to provide opacity and solar reflectivity to the coating; at least one component to provide protection to the coating from ultra-violet degradation; at least one filler component to increase the viscosity of the coating; and at least one film component that provides elongation and flexibility to the coating.

In further embodiments, the coating containing a seed oil further comprises at least one filler that adds opacity and durability to the coating; andat least one plasticizer that adds flexibility to the coating.

The coating can be a roof coating for a natural bitumen; a stucco replacement; and an elastomeric coating; and a metal coating.

In a further embodiment, the invention comprises a coating containing seed oil comprising: (a) phosphate modified epoxidized soybean oil in a proportional amount of between about 3% to about 20%; (b) hydrogenated dicyclopentadiene resin in a propotional amount of between about 2% to about 20%; (c) isophthalic alkyd in a proportional amount of between about 5% to about 30%; d) titanium dioxide in a proportional amount of between about 1% to about 15%; (e) zinc oxide in a proportional amount of between about 1% to about 10%; (f) genetically engineered cotton boll in a proportional amount of between about 5% to about 15%; (g) hydrogenated mineral spirits in a proportional amount of between about 5% to about 20%; (h) styrene ethylene butylenes styrene resins in a proportional amount of between about 5% to about 30%; (i) hydrated magnesium silicate in a proportional amount of between 10% to about 40%; (j) methyl soyate in a proportional amount of between about 1% to about 20%; (k) linseed oil copolymer in a proportional amount of between about 4% to about 20%; and (l) fatty acid methyl esters in a proportional amount of between about 1% to about 20%.

An illustrative formulation of a coating composition embodying the invention is set forth as follows (a) phosphate modified epoxidized soybean oil in a proportional amount of about 3% to about 20% used as a film forming component of the coating; (b) hydrogenated dicyclopentadiene resin in a proportional amount of about 2% to about 20% wherein the resin is used as a film forming component of the coating; (c) isophthalic alkyd in a proportional amount of about 5% to about 30% used as a film forming component of the coating; (d) titanium dioxide in a proportional amount of about 1% to about 15% which gives opacity and solar reflectivity to the coating; (e) zinc oxide in a proportional amount of about 1% to about 10% which gives protection to the coating from UV degradation; (f) genetically engineered cotton boll in a proportional amount of about 5% to about 15% used as a filler to increase viscosity and add structure to the coating; (g) hydrogenated mineral spirits in a proportional amount of about 5% to about 20% which reduces viscosity of the coating and increases leveling and flow; (h) styrene ethylene butylenes styrene resins in a proportional amount of about 5% to about 30% which acts as a film former that gives elongation and flexibility to the coating; (i) hydrated magnesium silicate in a proportional amount of about 10% to about 40% which acts as a filler that adds opacity and durability to the coating; (j) methyl soyate in a proportional amount of about 1% to about 20% which acts as a plasticizer that adds flexibility to coating; (k) linseed oil copolymer in a proportional amount of about 4% to about 20% which acts as a film former that lowers viscosity; and (l) fatty acid methyl esters in a proportional amount of about 1% to about 20% which functions as a plasticizer that adds flexibility to the coating.

THE DETAILED DESCRIPTION OF THE PRESENT INVENTION

The present invention is directed to coatings which include and incorporate seed oils. Applicable seed oils for the present invention include soybean oil, sunflower seed oil, linseed oil, castor oil, oiticica oil, tung oil, perilla oil, safflower oil, and corn oil. The invention provides seed oil based coatings having a multitude of applications. The invention is thus directed to a plurality of coatings which include organic seed.

A first embodiment is a coating which functions as a roof coating. The coating comprises an outer covering for one of the coatings used to waterproof various roofs and roofing membranes such as EPDM, Hypalon, and various types of modified bitumen. As a roof coating, the coating of the invention maintains a reflectivity after three years of greater than 0.70 (ASTM E 903) and an emissivity of greater than 0.92. By providing a highly reflective coating on the roof reduces the amount of heat that a building will absorb and thereby reduce the amount of air conditioning that is needed.

Additionally, the invention, due to its ability to reflect or not absorb heat, reduces the so-called "urban heat island effect." This phenomenon is caused by black roofs when they absorb and hold heat which thus raising ambient air temperatures thus leading to more conversion of carbon monoxide released from combustion engines to low level ozone. Moreover, by waterproofing and preserving the roof, instead of allowing the roof to tear off, the novel coating keeps debris from going into landfills. Additionally, when the coating is removed, there is no toxic degradation of the seed oil as occurs with asphalts.

The invention is also resistant to mold and fungal growth and exceeds the requirements of ASTM 3273. The constituents that comprise the embodiments can be varied in percentage to impart unique performance properties to a finished coating. The most notable is variable viscosity, solids content, elongation, flexibiltiy, drying time, adhesion and resistance to mold growth as measured by ASTM 3273.

By varying the percentage of constituents numerous products have been developed and tested that solve unique industry problems. In a most preferred embodiment, the invention comprises a plurality of coatings which have a number of applications. As noted, the applications include the above noted agricultural oil based product for a roofing material. A second application comprises a mold resistant interior and exterior coating that passes ASTM 3273 without the need for additives that are poisonous or toxic and do not have a HMIS health rating higher than 1 and produces no off gassing and produces no smoke when tested under ASTM E 84.

The present invention also has applications to stucco type coatings. The novel coating can be used as a replacement for "Dryvit" or Stucco that is biobased and 100% resistant to water and can be applied in one coat. A still further application of the present invention is as a a metal coating that can prime and preserve metal in one coat and prevent rust bleed through.

A further application of the present invention is as a caulk that provides over 200% elongation and can be used to bridge cracks of over 1/2 inch in width. A further application is a coating for numerous substrates that will have over 800% elongation for areas that have excessive movement. The invention further has application as a penetrating stain that preserves wood.

ILLUSTRATIVE FORMULATION

An illustrative formulation of a coating composition embodying the present invention is set forth as follows.

(a) phosphate modified epoxidized soybean oil in a proportional amount of about 3% to about 20% used as a film forming component of the coating (recognized by those of skill in the art as prepared from epoxidized or blown vegetable oils (commercially available from Archer Daniels Midland Company, for example expoxidized soy oil) reacted with phosphoric acid at 0.5 to 1.5% so that the, for example, treated soybean oil now contains tri-phosphate esters which is then heated to a temperature of 95° F. to 105° F. water and a small amount of phosphoric acid to complete the reaction, wherein the phosphated vegetable oil contains 0.5 to 1.5% weight percent phosphorous chemically bonded to the oil);

(b) hydrogenated dicyclopentadiene resin in a proportional amount of about 2% to about 20% wherein the resin is used as a film forming component of the coating;

(c) isophthalic alkyd in a proportional amount of about 5% to about 30# used as a film forming component of the coating (recognized by those of skill in the art as a reaction between a fatty acid derived from soybean or linseed oils and a polyhydic alcohol such as glycerol, pentaerythritol, trimethyolol propane, etc. having an acid value from 3 to 15 and an oil length of 50 to 80% as commonly available from the Cargill Company, Pennisula Polymers, Reichold Chemical, etc.);

(d) titanium dioxide in a proportional amount of about 1% to about 15% which gives opacity and solar reflectivity to the coating;

(e) zinc oxide in a proportional amount of about 1% to about 10% which gives protection to the coating from UV degradation;

(f) genetically engineered cotton boll in a proportional amount of about 5% to about 15% and used a filler to increase viscosity and add structure to the coating (recognized by those of skill in the art as a naturally occurring resurfacing filler that comes in various particle sized ranging from 30 to 50 microns, the larger of which give a textured look to a finished coating, that is commonly available from Impact Composite Technologies as product designations Renfil 30 and Renfil 50);

(g) hydrogenated mineral spirits in a proportional amount of about 5% to about 20% which reduces viscosity of the coating and increases leveling and flow;

(h) styrene ethylene butylenes styrene resins in a proportional amount of 5% to about 30% which acts as a film former that gives elongation and flexibility to the coating (recognized by those of skill in the art as thermoplastic polymers commonly available from Kraton Polymers as product designations G-1651, G-1650, G-1726, etc.);

(i) hydrated magnesium silicate in a proportional amount of about 10% to about 40% which acts as a filler that adds opacity and durability to the coating;

(j) methyl soyate in a proportional amount of about 1% to about 20% which acts as a plasticizer that adds flexibility to coating;

(k) linseed oil copolymer in a proportional amount of about 40$ to about 20% which acts as a film former that lowers viscosity (recognized by those of skill in the art as a linseed based product that is produced by the Cargill Company under the product designation Cargill Dilulin);

(l) fatty acid methyl esters in a proportional amount of about 1% to about 20% which functions as a plasticizer that adds flexibility to the coating (recognized by those skilled in the art as a product commonly available from the Stepan Company under product designation Stepsol SB-W or from AG Environmental Products under product designation SoyGold 1000);

The following examples set forth specific embodiments of the present invention.

EXAMPLE 1

Roofing Jacket

In a preferred embodiment, the invention comprises a coating for a roof such as constructed of natural bitumen. The invention is an oil based product which can achieve Energy Star Approval as a roof coating. In a preferred embodiment, the invention as a roof coating comprises the following constituents:

Phosphate modified epoxidized soybean oil in a proportional amount of about 10%

Hydrogenated dicyclopentadiene resin in a proportional amount of about 15%

Isophthalic alkyd in a proportional amount of about 20%

Titanium dioxide in a proportional amount of about 6%

Zinc oxide in a proportional amount of about 3%

Hydrogenated Mineral Spirits in a proportional amount of about 8%

Styrene ethylene butylenes styrene resin in a proportional amount of about 10%

Hydrated magnesium silicate in a proportional amount of about 20%

Methyl soyate in a proportional amount of about 2%

Linseed oil copolymer in a proportional amount of about 4%

Fatty acid methyl esters in a proportional amount of about 2%

The resultant coating is approximately 100% resistant to ponding water for the entire test period. (ASTM-398); provides a UL Class A Fire Rating (ASTM E 84); and Emissivity over 0.92 (ASTM E 408); a Volitale Organic Content between 0 and 15% (1.8 to 0 pounds/gallon); a Reflectivity greater that 0.75 after 3 years. (ASTM E 903); a Health rating of 1 or less; a Reactivity rating of zero and and will meet Energy Star approval.

From a performance standpoint, the coating is resistant to alkali and acids over the life of the coating. It is resistant to fungal and bacterial attack over life of coating. It passes ASTM 3273 as a mold resistant coating. It prevents bleed through of asphalt and modified bitumen roofing membranes. It adheres to ferrous and non ferrous metals, wood, concrete, cement, brick, asphalt, PVC, EPDM, Hypalon and modified bitumen. Finally, it can cure and remain flexible in various film thickness from 3 to 1000 mils and adds adds minimum weight to roofs.

The novel coating further provides the following application advantages. First, it contains no metal driers. Second, it will not form a skin in unopened containers. It further has an extended application season. It can be applied at temperatures ranging from from 30° F. to 100° F. It can also be brushed, rolled or sprayed on.

According, the coating has numerous advantages. This include the elimination the burning and fire hazard caused by of hot asphalt; greater cold weather flexibility than hot asphalt; the need for less labor and equipment; and the provision of a stronger, blister-free roof.

EXAMPLE 2

Stucco Jacket

In a further embodiment, the invention can function as a replacement for "Dryvit" or Stucco that is biobased and resistant to water and applyable in one coat. This embodiment comprises the following constituents:
Phosphate modified epoxidized soybean oil in a proportional amount of about 15%
Hydrogenated dicyclopentadiene resin in a proportional amount of about 10%
Isophthalic alkyd in a proportional amount of about 19%
Titanium dioxide in a proportional amount of about 1%
Zinc oxide in a proportional amount of about 3%
Hydrogentated Mineral Spirits in a proportional amount of about 4%
Styrene ethylene butylenes styrene resin in a proportional amount of about 15%
Hydrated magnesium silicate in a proportional amount of about 10%
Methyl soyate in a proportional amount of about 2%
Linseed oil copolymer in a proportional amount of about 4%
Fatty acid methyl esters in a proportional amount of about 2%
Genetically Engineered Cotton Boll in a proportional amount of about 15%

EXAMPLE 3

Elastomeric Jacket

The invention also provides a oating for numerous substrates that will have over 800% elongation for areas that will have excessive movement. In a preferred embodiment, this invention comprises the following constituent components:
Phosphate modified epoxidized soybean oil in a proportional amount of about 10%
Hydrogenated dicyclopentadiene resin in a proportional amount of about 20%
Isophthalic alkyd in a proportional amount of about 3%
Titanium dioxide in a proportional amount of about 5%
Zinc oxide in a proportional amount of about 5%
Hydrogenated Mineral Spirits in a proportional amount of about 30%
Styrene ethylene butylenes styrene resin in a proportional amount of about 16%
Hydrated magnesium silicate in a proportional amount of about 11%

EXAMPLE 4

Novel Metal Jacket

The invention can also function as a metal coating that can prime and preserve metal in one coat and prevent rust bleed through. This embodiment comprises:
Phosphate modified epoxidized soybean oil in a proportional amount of about 10%
Hydrogenated dicyclopentadiene resin in a proportional amount of about 10%
Isophthalic alkyd in a proportional amount of about 15%
Titanium dioxide in a proportional amount of about 6%
Zinc oxide in a proportional amount of about 5%
Hydrogenated Mineral Spirits in a proportional amount of about 12%
Styrene ethylene butylenes styrene resin in a proportional amount of about 15%
Hydrated magnesium silicate in a proportional amount of about 19%
Methyl soyate in a proportional amount of about 2%
Linseed oil copolymer in a proportional amount of about 4%
Fatty acid methyl esters in a proportional amount of about 2%

The present invention has been described with reference to the enclosed preferred embodiment and examples. It is to be appreciated that the true nature and scope of the present invention is to be determined with reference to the claims appended hereto.

The invention claim is:
1. A coating containing seed oil comprising:
(a) phosphate modified epoxidized soybean oil in a proportional amount of between about 3% to about 20%;
(b) hydrogenated dicyclopentadiene resin in a propotional amount of between about 2% to about 20%;
(c) isophthalic alkyd in a proportional amount of between about 5% to about 30%;
(d) titanium dioxide in a proportional amount of between about 1% to about 15%;
(e) zinc oxide in a proportional amount of between about 1% to about 10%;
(f) genetically engineered cotton boll in a proportional amount of between about 5% to about 15%;
(g) hydrogenated mineral spirits in a proportional amount of between about 5% to about 20%;
(h) styrene ethylene butylenes styrene resins in a proportional amount of between about 5% to about 30%;
(i) hydrated magnesium silicate in a proportional amount of between 10% to about 40%;
(j) methyl soyate in a proportional amount of between about 1% to about 20%;
(k) linseed oil copolymer in a proportional amount of between about 4% to about 20%; and
(l) fatty acid methyl esters in a proportional amount of between about 1% to about 20%.
2. A coating composition comprising:
(a) phosphate modified epoxidized soybean oil in a proportional amount of about 3% to about 20% used as a film forming component of the coating;
(b) hydrogenated dicyclopentadiene resin in a proportional amount of about 2% to about 20% wherein the resin is used as a film forming component of the coating;
(c) isophthalic alkyd in a proportional amount of about 5% to about 30% used as a film forming component of the coating;
(d) titanium dioxide in a proportional amount of about 1% to about 15% which gives opacity and solar reflectivity to the coating;
(e) zinc oxide in a proportional amount of about 1% to about 10% which gives protection to the coating from UV degradation;
(f) genetically engineered cotton boll in a proportional amount of about 5% to about 15% used as a filler to increase viscosity and add structure to the coating;

(g) hydrogenated mineral spirits in a proportional amount of about 5% to about 20% which reduces viscosity of the coating and increases leveling and flow;
(h) styrene ethylene butylenes styrene resins in a proportional amount of about 5% to about 30% which acts as a film former that gives elongation and flexibility to the coating;
(i) hydrated magnesium silicate in a proportional amount of about 10% to about 40% which acts as a filler that adds opacity and durability to the coating;
(j) methyl soyate in a proportional amount of about 1% to about 20% which acts as a plasticizer that adds flexibility to coating;
(k) linseed oil copolymer in a proportional amount of about 4% to about 20% which acts as a film former that lowers viscosity; and
(l) fatty acid methyl esters in a proportional amount of about 1% to about 20% which functions as a plasticizer that adds flexibility to the coating.

* * * * *